3,135,238
WATER FILTERING AND CIRCULATING SYSTEM FOR AN AQUARIUM
Harold Eyl, 190—15B 73rd Ave., Fresh Meadows, N.Y.
Filed June 20, 1961, Ser. No. 118,357
1 Claim. (Cl. 119—5)

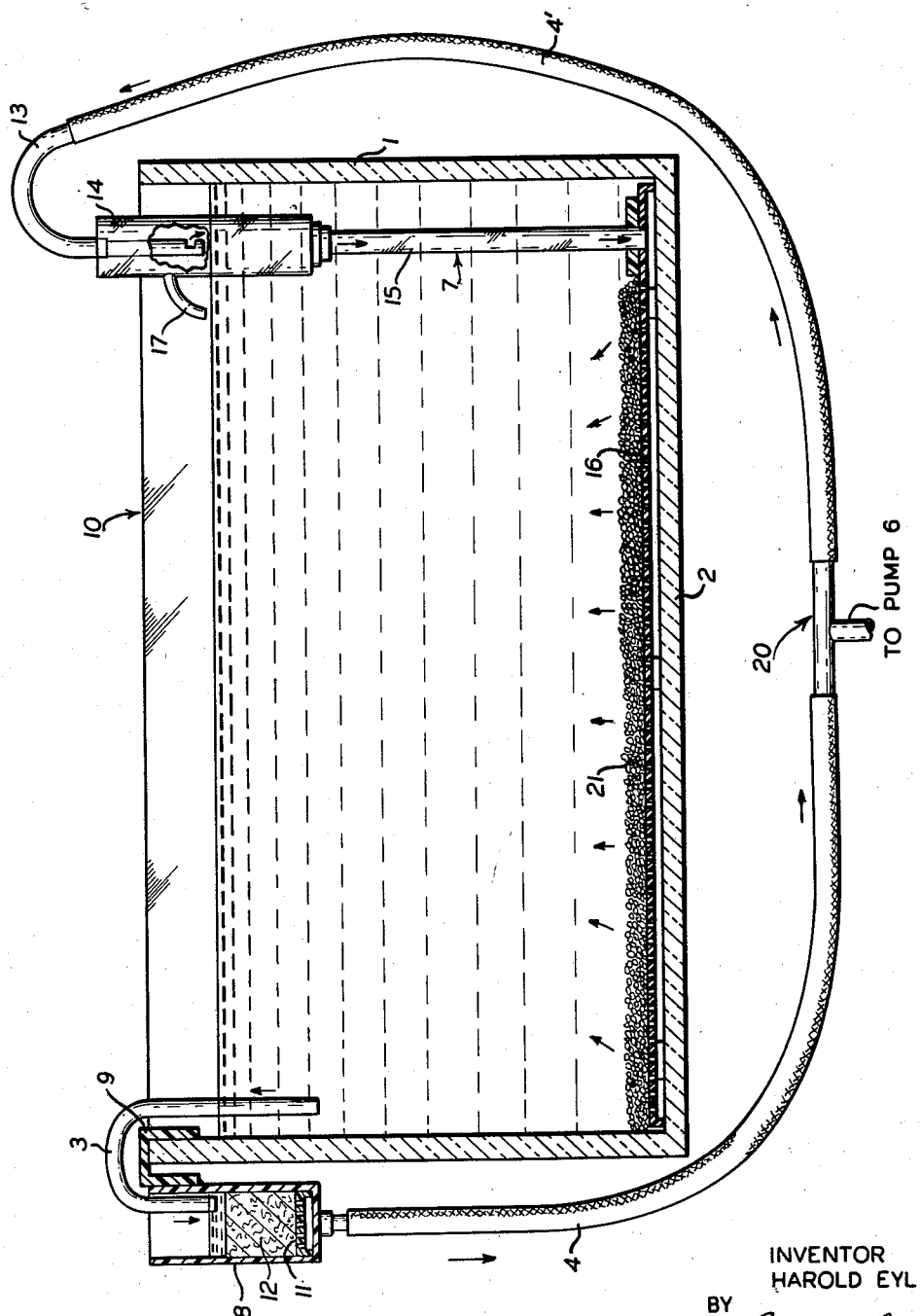

This invention relates to aquariums, and more particularly, to systems for recirculating the water in an aquarium tank.

In order to maintain correct balance of the water with respect to temperature, purity and the like, for the purpose of maintaining healthy fish, aquarium systems are conventionally provided with filtering mechanisms. The circulating water includes waste and other foreign matter, which is passed through the filtration mechanisms for the removal of said foreign matter and thence delivered to the tank in a filtered condition.

An object of the invention is to improve filtration of circulating water in aquarium tanks.

Another object of the present invention is to provide a simple, inexpensive device for effecting filtration, aeration and circulation of the water in an aquarium.

Another object of the invention is to provide in a fish aquarium a circulating system and purifying arrangement where impurities such as decayed food or other waste material may be withdrawn automatically by siphoning from the water in a tank and thereafter filtering, thereby preventing the pollution of the water and conserving the life of the fish in the aquarium.

A further object of the invention is to provide a system for an aquarium which circulates the water through gravel and aerates it sufficiently uniformly throughout the aquarium to prevent the build-up of harmful and noxious gases deleterious to the plant and fish life.

A feature of the invention is a filter receptacle including a siphon hung on and connected to the aquarium tank.

Another feature of the invention is a filter receptacle having a coarsely apertured filter plate.

Another feature of the invention is a water circulation arrangement for an aquarium comprising inlet and outlet hoses, a circulating pump and an air vent tube.

Another feature of the invention is a base plate for the aquarium having fine apertures for filtration of fine foreign particles and an integral peripheral flange for retaining gravel or sand.

Other objects of the present invention will become apparent in connection with the accompanying specification and claim wherein:

FIG. 1 is a sectional view of an aquarium circulation and filter system in accordance with the invention.

Referring to the figure of the drawing an aquarium tank 10 has sidewalls 1 and a bottom wall 2, on which coarse gravel or sand rests. The tank 10 is provided with water, fish and plant life in the customary manner.

It is desirable to maintain a continuous circulation of the water in the tank, as is well-known. Likewise, the water must be maintained pure and free from sediment and foreign matter. Filtration mechanisms are provided for this purpose.

The circulation system shown in FIG. 1 in accordance with the invention includes a siphon hose 3, inlet and outlet flexible pipes 4, 4′ connected to a circulating pump 6 of conventional construction, and a water inlet tube 7.

The filtration system associated with the aforementioned circulating arrangement 20 includes a plastic filter receptacle 8, which is hung exteriorly over the aquarium tank 10 by a hook 9. The siphon hose 3 provides a fluid coupling between the filter receptacle 8 and the tank 10. Resting on the bottom of receptacle 8 is a plastic filter plate 11 with coarse openings which permit the passage of water and retain coarse waste. The filter plate 11 is provided with integral plastic feet which maintain the plate in a level position. A filter bed 12 of solid particles such as sand and the like, glass wool, etc., rests on filter plate 11 to catch waste and sediment.

The circulating water, after having been filtered and purified in its passage through the receptacle 8, filter plate 11 and filter bed 12, passes into a flexible inlet pipe 4 connected to a nipple depending from the bottom of the receptacle 8. A circulating pump connects the inlet and outlet pipe 4, 4′ for the purpose of providing a circulating force for the water. What happens is that air is pumped up through tube 4′ and pipe 13 down into air vent tube 14, as the drawing clearly shows. As the air thus moves upwardly through said tube 4′ and thence through pipe 13, it carries with it water siphoned out of tank 1 through siphon hose 3. The siphoned water enters the filter receptacle 8 and passes through the filter bed 12 and the filter plate 11, and it then passes downwardly through pipe 4 and fitting 20, where it is picked up by the air pumped into said fitting and carried upwardly through hose 4′ and pipe 13 down into air vent tube 14, tube 15, and to the space below filter base plate 16. This is hereinafter more fully described. The drain pipe 13 which is connected to the outlet hose 4′ comprises an air vent tube 14 with an integral cylindrical tube 15 of narrower bore connected thereto. It has been determined that the ratio of the bores in tubes 14 and 15 should be approximately 2:1 to provide an efficient water pressure and a proper flow of water through the system.

For the purpose of additional filtration of the finer particles of waste and foreign matter which escape filtration in the receptacle 8, there is provided a supplementary filter base plate 16 having a series of fine apertures. The plastic base plate 16, which rests on the bottom of the aquarium tank 10 has a filter bed of gravel on its top surface and is provided with a sloping peripheral flange depending therefrom.

Filter base plate 16 is provided with feet which serve as spacers to support said plate a spaced distance above the bottom wall 2 of the tank. The filtered water flows from tube 15 under base plate 16 in a fine stream and flows upwardly through the fine apertures as indicated by the arrows above the gravel 21 in FIG. 1. The air vent tube 14 is connected to the filter base plate 16 at one corner thereon. The curved vent 17 in the tube 14 provides for the escape of air bubbles from the circulating water into the atmosphere.

The plastic filter receptacle 8, flexible hoses 4, 4′ and air vent tube 14 are well adapted for mass production techniques. However, it should be appreciated that these components may be fabricated of any suitable material and manufactured in any desired manner.

A prime advantage of the circulation and filter system described herein is that minimal maintenance is required. With occasional changes of filter material in receptacle 8, plant life and fishes remain healthy for years because of the freshly filtered and newly oxygenated water fed directly thereto.

Although the present invention has been described with reference to a single embodiment thereof, it should be understood that certain changes and modifications may be made therein by those skilled in the art and within the spirit of the invention and the scope of the appended claim.

What I claim is:

In combination with an aquarium having a bottom and side walls, a recirculating system for cleaning water in said aquarium, said system comprising a filter tank mounted on one side wall of said aquarium, a filter medium within said tank, an apertured base plate supported on the bottom of and within said aquarium, spacing means being provided between said apertured base plate and said aquarium bottom, a granular filtering means supported on said apertured base plate, a siphon tube connecting said filter tank with the water within the aquarium and adapted to siphon water from said aquarium into said filter tank, a water inlet tube projecting upwardly from the apertured base plate to a point adjacent the top of the aquarium, the lower end of said tube communicating with the space between said apertured base plate and the bottom of the aquarium, an air pump, a fitting connected to said pump, first hose means connecting said filter tank with said fitting, second hose means connecting said fitting with the upper end of said water inlet tube, whereby water siphoned from said aquarium flows into said filter tank, through said filter medium, through said first hose means and into said fitting and is then carried by air bubbles emitted from said pump through said second hose means to the upper end of said water inlet tube and then into said aquarium through said tube and into the space below said apertured base plate, and thence through the apertures in said plate and up through the filtering means thereon and into the aquarium water.

References Cited in the file of this patent
UNITED STATES PATENTS

| | | |
|---|---|---|
| 880,783 | Marquardt | Mar. 3, 1908 |
| 2,636,473 | Schwartz et al. | Apr. 28, 1953 |
| 2,770,366 | Puzarowski | Nov. 13, 1956 |
| 2,772,867 | Cleckner | Dec. 4, 1956 |